J. T. PEDERSEN.
COFFEE URN.
APPLICATION FILED SEPT. 5, 1916.
1,249,818. Patented Dec. 11, 1917.
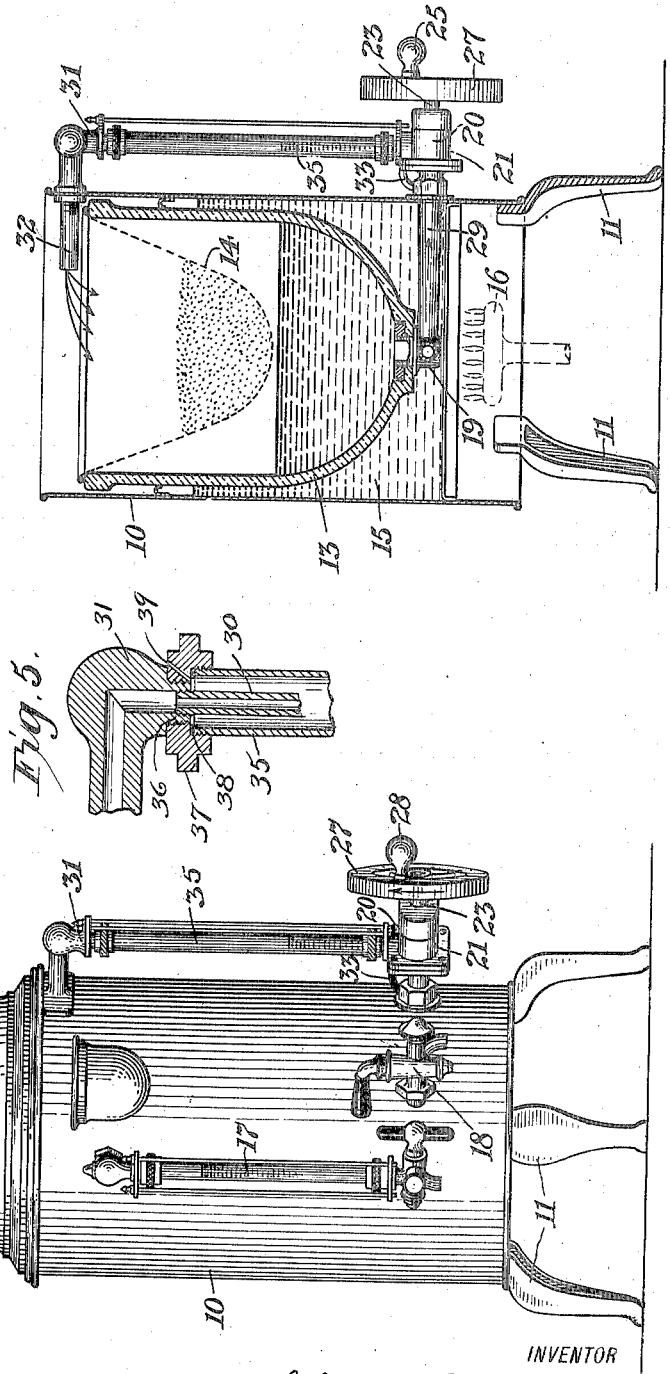
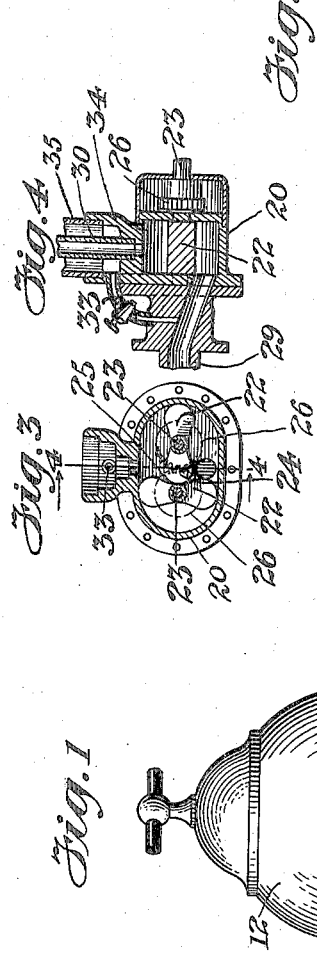
WITNESS
Chas. J. Clagett
INVENTOR
Johannes Th. Pedersen
BY
HIS ATTORNEYS

UNITED STATES PATENT OFFICE.

JOHANNES TH. PEDERSEN, OF FLUSHING, NEW YORK, ASSIGNOR OF ONE-HALF TO FREDERIC A. CAUCHOIS, OF NEW YORK, N. Y.

COFFEE-URN.

1,249,818.   Specification of Letters Patent.   Patented Dec. 11, 1917.

Application filed September 5, 1916. Serial No. 118,389.

*To all whom it may concern:*

Be it known that I, JOHANNES TH. PEDERSEN, a citizen of the United States, residing at Flushing, in the county of Queens and State of New York, have invented an Improvement in Coffee-Urns, of which the following is a specification.

This invention relates to a coffee urn and more particularly to a coffee circulating attachment therefor.

I am aware that heretofore in smaller coffee urns or coffee pots various forms of percolators have been employed by which the boiling water is permitted to rise through a central pipe and is permitted to flow downwardly through the ground coffee. I am also aware that heretofore it has been proposed to employ a pump for transferring the liquid coffee from the bottom to the top of an urn in which also a gage glass has been used. In some instances the gage glass is separate and independent from the pipe connection in which the pump is employed, and in other instances the gage glass has been made a part of the pipe connection through which the pump forces the coffee. In the former construction the urn is necessarily encumbered with attachments and in the latter if the gage glass breaks the coffee in the urn is lost through leakage and so far as I am aware there has been no provision made for preventing this. The object of my invention is to overcome these difficulties and provide in a coffee urn an apparatus by which coffee may be forced from the bottom of the urn to the top thereof and in which also the height of the coffee under normal conditions may be seen in a gage.

In carrying out my invention I employ the pipe connection through which the coffee is forced by a suitable pump in conjunction with a gage which surrounds a portion at least of the pipe connection so that while concentric with one another the passageway in the pipe connection is independent of the space between the same and the gage as will be hereinafter more particularly described.

In the drawing, Figure 1 is an elevation of a coffee urn including the means which comprise my present invention.

Fig. 2 is a central longitudinal section thereof.

Fig. 3 is a central transverse section taken through the pump and illustrated on an enlarged scale, Fig. 4 is a similar view taken at right angles to the position of the pump as shown in Fig. 3, and Fig. 5 is a partial central longitudinal section showing the connection between the gage glass, the pipe connection, and the elbow in which the upper end of these parts is secured.

Referring to the drawing, 10 represents the frame or cylindrical shell of a coffee urn which as is customary is made of copper or any other suitable metal. This cylindrical shell is supported upon legs 11 and being open at the top is provided with a cap or cover 12. Interiorly the shell 10 is fitted with a receptacle 13 adapted to receive and contain the coffee and at its upper end in the receptacle 13 there is a strainer 14 in which the ground coffee is placed in making the beverage. Between the shell 10 and the receptacle 13 there is a chamber 15 for water which in making the coffee is boiled by the flame from suitable gas burners 16 or other heating devices placed beneath the bottom of the shell 10. In a suitable position the urn is fitted with a water gage 17 by which the height of the water in the chamber 15 may be observed, and the urn is also provided with a suitable faucet or cock 18 by which the coffee may be withdrawn for use, the faucet 18 being connected through a suitable pipe with a central discharge connection 19 fixed in the bottom of the receptacle 13.

Together with the hereinbefore described parts which are common in coffee urns of the type to which my invention relates, I employ a pump 20. This pump, as it will be understood, may be of any desired type but in the drawing I have illustrated a manually operated rotary pump in which the pistons draw the liquid in at the suction side of the pump and force the liquid out at the discharge side of the pump. As illustrated this pump 20 comprises a casing 21 in which there are co-acting revoluble pistons 22. Each piston 22 is mounted on a shaft 23 and at its ends is cam shaped, while centrally the sides are provided with recesses 25 in which the cam shaped ends 24 of the pistons work. These pistons are revolved by suitable gears 26 mounted respectively on the shafts 23. As indicated one shaft may be provided with a fly wheel 27 fitted with a handle 28 by which the pump may be manually operated. The suction end of the pump is connected to the discharge connection 19 by means of a pipe 29 and the discharge end of the pump is connected to one end of a pipe connection 30. The opposite end of the pipe connection 30, which may be of any desired length, is connected to one arm of an elbow 31 to the other arm of which is connected a pipe 32 extending through the frame or shell 10 and terminating at a point over the strainer 14 so that the pipe 32 may discharge into the strainer.

The discharge of the pump is enlarged as indicated at 34 and the mouth of the pump is recessed to receive one end of a gage glass 35. The gage glass 35 surrounds the pipe connection 30 and extends from the discharge of the pump to the lower end of the elbow 31. The lower end of this elbow 31 is of reduced diameter as indicated at 36 and is exteriorly screw-threaded to receive a collar 37. The collar 37 is suitably recessed to receive the upper end of the gage glass 35, and as shown in Fig. 5, the recess in the collar may be fitted with a washer 38 so that when the collar is turned down a tight joint may be made between the same and the upper end of the gage glass. In this collar 37 there is a vent 39 making communication between the annular space within the gage glass and the atmosphere, it being understood that the pressure within the coffee urn is substantially the same as the pressure of the atmosphere outside of the same, so that by providing this vent 39 the height to which the coffee will rise in the coffee gage glass is substantially the same as the height of the coffee within the urn. Also as shown in Fig. 5 and as will be understood, the upper end of the pipe connection 30 is screw-threaded and permanently connected in the tapped lower end of the elbow 31. I also employ a by-pass 33 fitted with a suitable cock and making communication between the suction end of the pump and the annular space between the pipe connection 30 and the gage glass 35, as is clearly indicated in Figs. 3 and 4.

From the foregoing it will be apparent that instead of pouring and repouring the coffee in making or increasing the same to the required strength the pump 20 may be operated by turning the fly wheel 27 and its operation continued as long as may be necessary causing the coffee to circulate from the bottom of the urn through the pump to the pipe connection 30, independently of the gage glass, through the pipe 32, to the upper end of the urn. During this operation the cock in the by-pass connection 33 is preferably closed and opened again after the circulation of the coffee is completed whereby as will also be readily understood the coffee will rise in the annular space between the gage glass and that portion of the pipe connection which it surrounds to indicate the level of the coffee in the urn.

I claim as my invention:

1. In a coffee urn and in combination a receptacle, a pump, a pipe connection between the suction of the pump and the bottom of the receptacle, a combined pipe connection and gage glass between the discharge end of the pump and the top of the receptacle, there being an annular space between the gage glass and that portion of the said pipe connection surrounded by the same, and means providing communication between the suction side of the pump and the said annular space between the combined pipe connection and gage glass.

2. In a coffee urn and in combination, a manually operated pump, a pipe connection between the suction side of the pump and the bottom of the receptacle, a pipe connection between the discharge side of the pump and the top of the receptacle, a gage glass surrounding a portion of the last aforesaid pipe connection with an annular space between the same, and a valve controlled connection making communication between the suction side of the pump and the said annular space between the said gage glass and that portion of the said pipe connection surrounded by the same.

Signed by me this 17th day of August, 1916.

JOHANNES TH. PEDERSEN.